No. 636,832. Patented Nov. 14, 1899.
J. P. MÜLLER.
FENDER FOR VEHICLES.
(Application filed Aug. 5, 1899.)

(No Model.) 2 Sheets—Sheet 1.

WITNESSES:
INVENTOR
John P. Müller.
BY
ATTORNEY

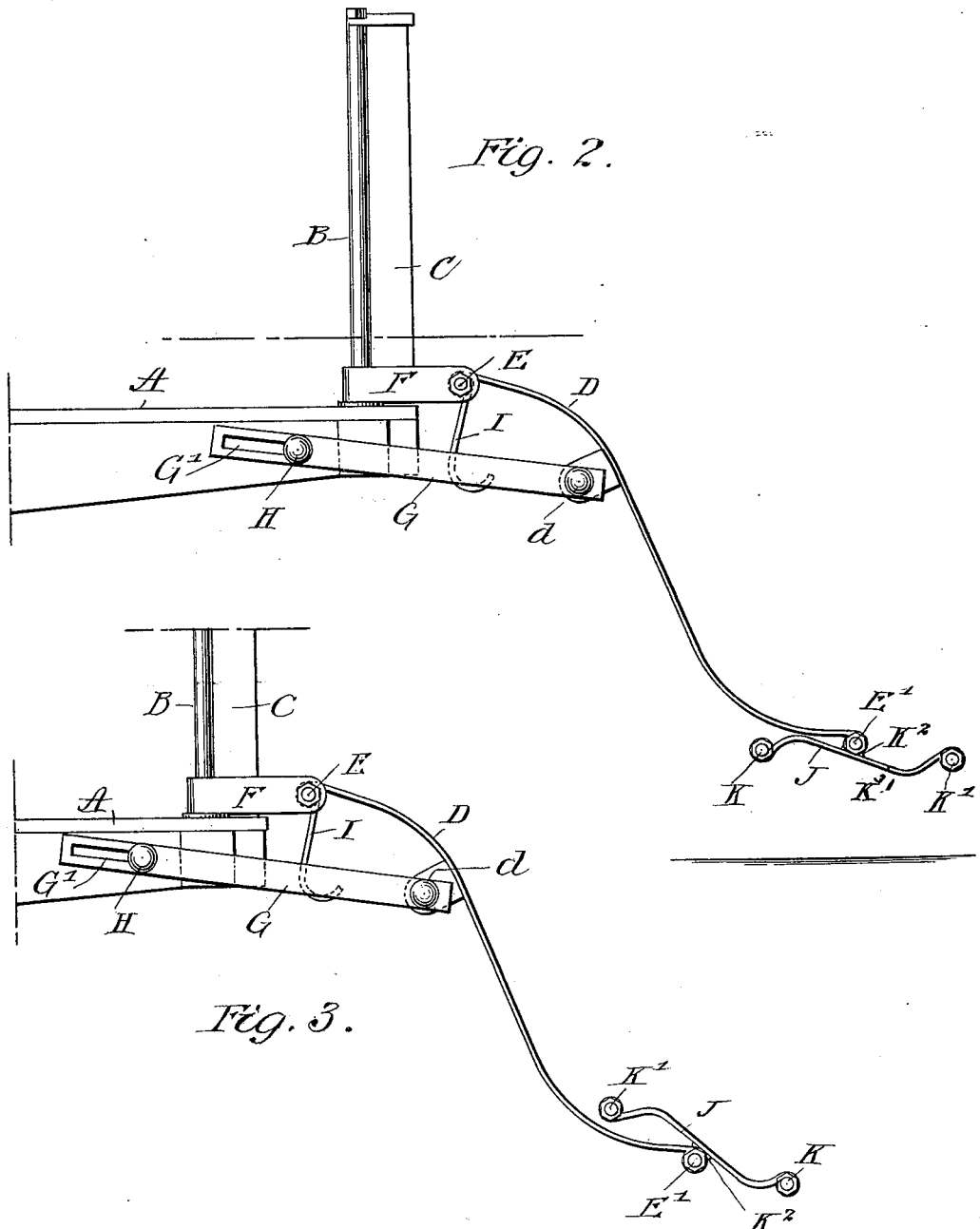

UNITED STATES PATENT OFFICE.

JOHN P. MÜLLER, OF NEW YORK, N. Y., ASSIGNOR OF TWO-THIRDS TO LOUIS GOLDSMITH, JR., AND NATHAN GOLD, OF SAME PLACE.

FENDER FOR VEHICLES.

SPECIFICATION forming part of Letters Patent No. 636,832, dated November 14, 1899.

Application filed August 5, 1899. Serial No. 726,240. (No model.)

*To all whom it may concern:*

Be it known that I, JOHN P. MÜLLER, a subject of the Emperor of Germany, residing at New York, borough of Manhattan, county and State of New York, have invented certain new and useful Improvements in Fenders for Vehicles, of which the following is a full, clear, and exact description.

My invention relates to fenders for vehicles—such as, for example, tram-cars; but the same might be used to advantage on any horseless vehicle.

The object of my invention is to provide a fender which is effective in operation, simple and comparatively inexpensive in construction, and so arranged with relation to the vehicle that it may be readily raised out of the operative position or lowered into said position.

Figure 1:
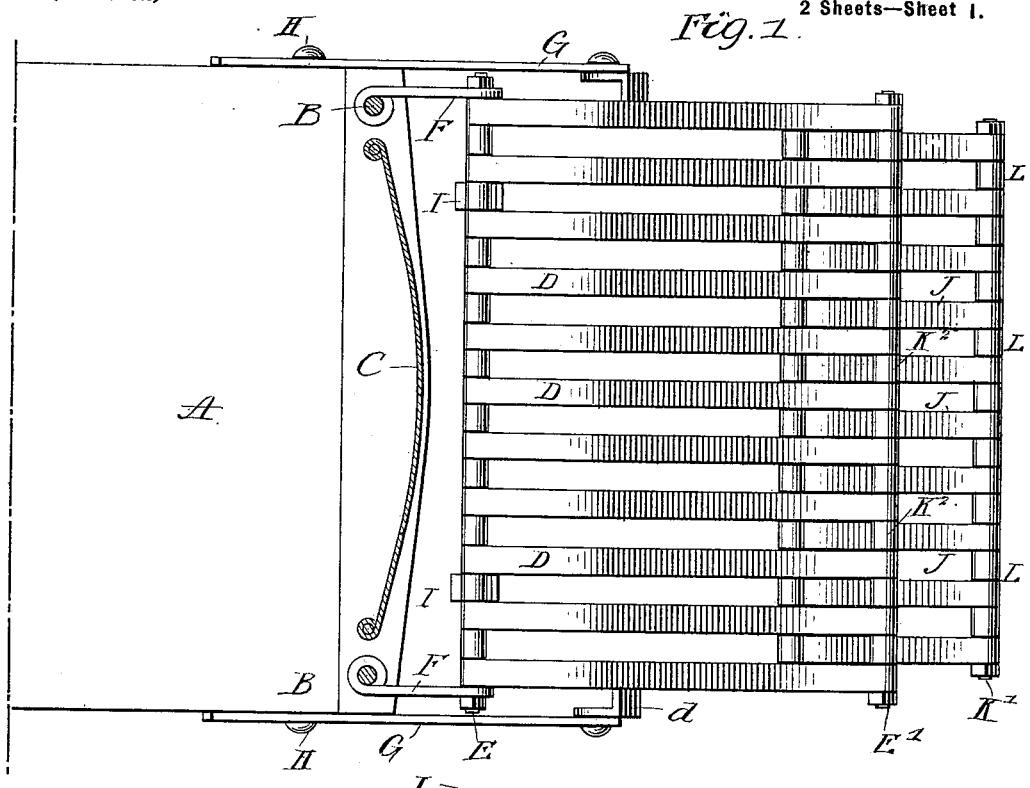
Figure 4:
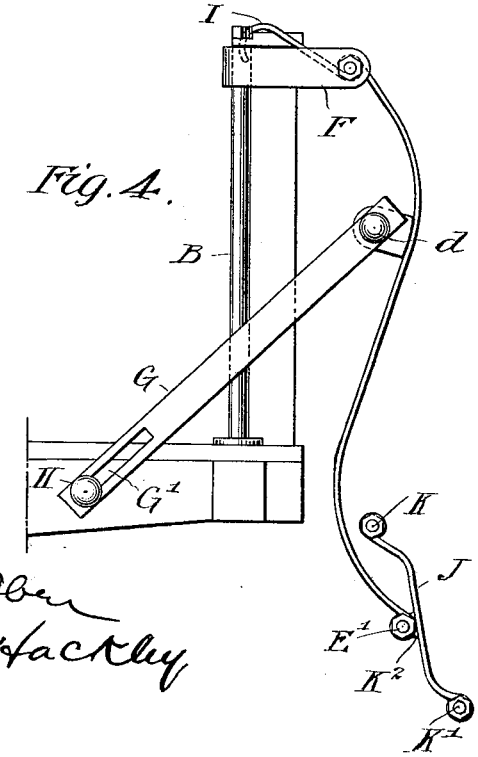

In the drawings, Figure 1 is a plan view. Fig. 2 is a side elevation thereof. Fig. 3 is a similar view with one of the parts in a different position. Fig. 4 is a similar view to that shown in Fig. 3, excepting that the fender is raised.

A is a vehicle.

B B are the hand-rods which it is common to provide near the end and toward opposite sides of the vehicle.

C is a dashboard. In front of the dashboard the fender is supported in the manner hereinafter described. The main portion of the fender is composed of a number of flexible straps D D, which extend longitudinally of the vehicle and which are suitably connected at opposite ends to cross-bars E E'.

F F are links which are each slidably mounted at one end upon the rods B B and at their opposite ends connected to the main body of the fender—as, for example, to the ends of the rod E. The links F are preferably of such a width that they engage with the rods B in such a manner as to normally stand at right angles thereto.

G G are a second pair of links, which for the purpose of identification will be termed "intermediate" links. These links G are each pivotally connected at one end to an intermediate portion of the main body of the fender—for example, as at $d$—while their opposite ends are connected to the vehicle. One or both of the connections for the links G may be such as to permit the links to slide. This end may be accomplished by providing a slot G', through which slot the bolt or fastening means H, carried by the vehicle, may pass. The other end of each link may be slotted, if desired, and such an alternative is too obvious to require specific illustration.

I I are hooks which, if desired, may be carried by the bar E, whereby the fender may be held when in its raised position, as shown in Fig. 4, by engaging said hooks I with the upper part of the dashboard C. The bar E' is never normally closely adjacent to the ground and will only be depressed in the event that the fender meets an obstruction, which would cause it to descend by reason of the flexibility of the main body of the fender. As a consequence, except in the case of an emergency, the fender will not rub along the ground, and thereby the attending noise and wear will be obviated.

At the forward end of the fender is hinged a trip device composed, chiefly, of flexible straps J J, secured at opposite ends to rods K K'. $K^3$ is a projection located at the forward portion of the trip. This trip device is preferably hinged at an intermediate point, as at $K^2$, to the rod E'. It is desirable that the normal position of the trip device should be such as shown in Fig. 1, and this may be attained by suitably balancing said trip device or by the use of a light spring. The bars K K', to which the straps J are connected, are preferably provided with antifriction-rollers L L', respectively.

Operation: Starting with the fender in the inoperative position, (indicated in Fig. 4,) as soon as it is desired to move it into the operative position the hooks I are freed from the dashboard and the rear end of the fender is dropped, the links F at the same time sliding down the rods B. The intermediate links G will during this downward movement of the fender cause the lower end of the fender to be advanced. The trip device at the lower end of the fender may be then tilted into the position indicated in Figs. 1 and 2, either manually or by the use of any simple well-known light spring. Assuming the vehicle is moving and an obstruction is encountered, it would either be picked up directly upon the fender or, if the said obstruction were located so low as to escape the rollers L, it would cause the trip to be tilted from the position indicated in Fig. 1 to that indicated in Fig. 3 by reason of the obstruction striking the curved projection on the under side of the forward portion of the trip, as shown in Fig. 2, which tilting of the trip would swing its end K down into close contact with the ground and then up to the position of Fig. 3, which movement of the trip device would tend to raise the obstruction up onto the main body of the fender, by which it would be carried until the vehicle stopped.

It is desirable that the trip J should be adjusted to hang so that the projection $J^3$ is about on a level with the center of gyration of the trip. When thus balanced, a very slight upward movement of the projection $K^3$ places it above the center of rotation. If the projection $K^3$ is carried much lower than this, the rear scoop portion of the trip J will not be brought forward quickly enough, and consequently will fail to wedge under the obstruction and raise the same, as would otherwise be the case if the trip were hung properly.

Obviously the construction hereinbefore referred to and specifically shown in the drawings may be modified and changed in details of construction and arrangement of parts in many respects, and therefore I do not wish to have it understood that I intend to limit myself to the exact thing described, but anticipate that various changes may be made without departing from the spirit and scope of the invention.

What I claim is—

1. A fender for vehicles comprising a main flexible body, supporting-links at one end thereof for connecting the upper end of said main body to the vehicle, intermediate links pivotally connected at one end to an intermediate portion of said main body and slidably connected at the opposite end to a pivotal support on the vehicle, and a tilting trip device toward the lower end of said main body of said fender.

2. A fender for vehicles comprising a main flexible body, supporting-links at one end thereof for connecting the upper end of said main body to the vehicle, intermediate links pivotally connected at one end to an intermediate portion of said main body and slidably connected at the opposite end to a pivotal support on the vehicle, a tripping device comprising a pivoted portion having front and rear scoops, and a projection on the under side of said front scoop whereby said front scoop will be deflected upwardly and said rear scoop brought downwardly and forwardly when an obstruction is encountered by said projection.

3. A tripping device comprising a pivoted portion having front and rear scoops, and a projection on the under side of said front scoop whereby said front scoop will be deflected upwardly and said rear scoop brought downwardly and forwardly when an obstruction is encountered by said projection.

4. A fender for vehicles comprising a main flexible body, supporting-links at one end thereof for connecting the upper end of said main body to the vehicle, intermediate links pivotally connected at one end to an intermediate portion of said main body and slidably connected at the opposite end to a pivotal support on the vehicle, a tilting trip device toward the lower end of said main body of said fender, and means for holding said main body and trip in an elevated position.

Signed this 28th day of July, 1899.

JOHN P. MÜLLER.

Witnesses:
R. C. MITCHELL,
LOUIS GOLDSMITH, Jr.